June 15, 1965 R. MAYER 3,188,866
HIGH SPEED TEMPERATURE SENSING DEVICE
Original Filed July 16, 1957 2 Sheets-Sheet 1
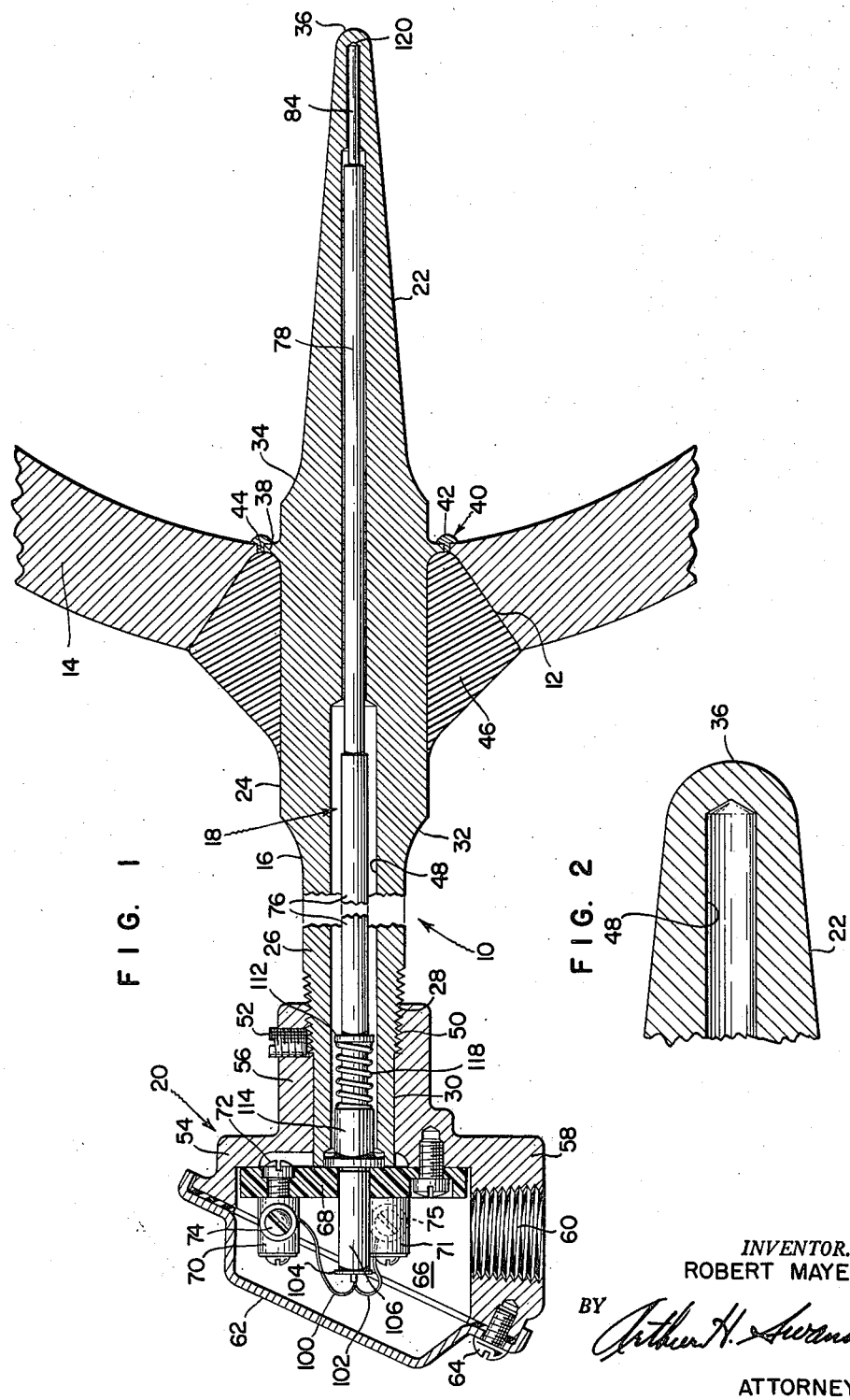
INVENTOR.
ROBERT MAYER
BY *Arthur H. Swanson*
ATTORNEY.

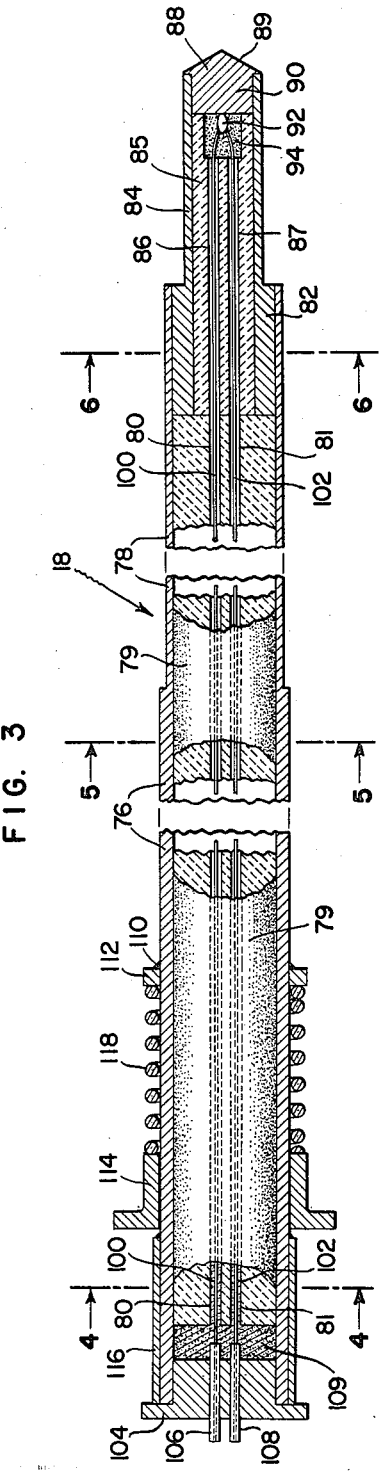
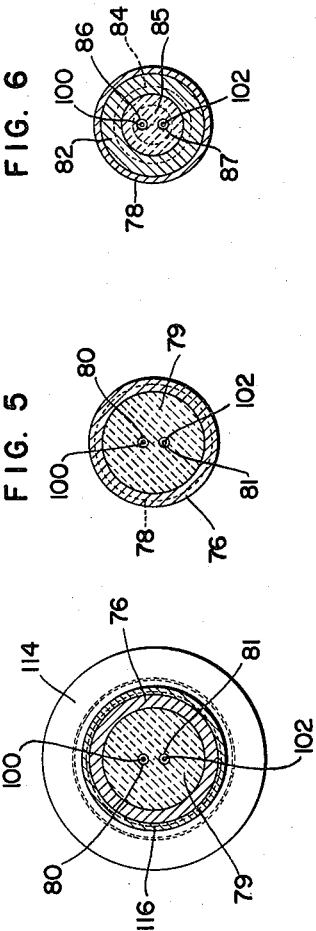
INVENTOR.
ROBERT MAYER
BY Arthur H. Swanson
ATTORNEY.

United States Patent Office 3,188,866
Patented June 15, 1965

3,188,866
HIGH SPEED TEMPERATURE SENSING DEVICE
Robert Mayer, Ardmore, Pa., assignor to Honeywell Inc., a corporation of Delaware
Continuation of abandoned application Ser. No. 672,328, July 16, 1957. This application Mar. 13, 1961, Ser. No. 96,067
8 Claims. (Cl. 73—362)

This application is a continuation of my earlier filed application having Serial No. 672,328 filed on July 16, 1957 now abandoned and assigned to the same assignee as this application.

This invention relates to a high speed temperature sensing device and particularly to a high speed temperature sensing device for measuring the temperature of flowing liquids under great pressure.

The problems of measuring the temperature of flowing liquids are manifold. These problems are compounded when the rate of flow is high and when the flowing liquid is under great pressure. Among the problems encountered under such conditions is that most temperature sensing devices heretofore known do not respond to temperature changes at a fast enough rate. Accordingly, when a high flow rate is encountered, the temperature sensing device is not able to record the temperature of the liquid surrounding the device at any particular instance. Moreover, rapid rates of flow of the liquid tend to set up vibrations in the temperature sensing device, which vibrations may lead to mechanical failure of the device or of the seal between the device and the conduit through which the liquid is flowing. These tendencies are compounded by the high pressure to which the system is subjected. Another difficulty which is encountered in measuring the temperature of rapidly flowing liquids under great pressure is that the temperature sensing device is required to have sufficient mechanical strength to resist crushing by the great pressure of the liquid. However, if devices heretofore known are constructed with sufficient mechanical strength to resist the liquid pressure, the thickness of the device is so great as to provide an inordinately large time lag in the measuring of the temperature of the liquid. This is clearly undesirable.

It is therefore one object of the present invention to provide a new and improved temperature sensing device for measuring the temperature of liquids flowing at rapid rates and under high pressure.

Another object of the present invention is the provision of a new and improved temperature sensing device which has a rapid response to temperature changes and is yet able to withstand great pressures.

Another object of the present invention is the provision of a new and improved temperature sensing device which has a natural mechanical frequency that is sufficiently high to prevent the device from resonating as a result of the flow of liquid past the device.

A better understanding of the present invention may be had from the following detailed description when read in connection with the accompanying drawings in which:

FIG. 1 is a longitudinal sectional view of a temperature sensing device embodying the present invention with certain details deleted to more clearly illustrate other features of the invention;

FIG. 2 is an enlarged view of the end portion of the device shown in FIG. 1 which is disposed within the conduit;

FIG. 3 is a longitudinal sectional view of the insert of the temperature sensing device including the temperature sensing element;

FIG. 4 is a sectional view taken along the line 4—4 of FIG. 3;

FIG. 5 is a sectional view taken along the line 5—5 of FIG. 3; and

FIG. 6 is a sectional view taken along the line 6—6 of FIG. 3.

Referring now to the drawings in detail and particularly to FIG. 1 thereof, the temperature sensing device is generally designated by the reference numeral 10. The device is shown fixedly mounted in a tapered aperture 12 of a conduit or pipe 14 through which liquid flows. Device 10 comprises a well 16, an insert 18 disposed within the well and a head and terminal block assembly 20 threadedly secured to the end of the well 16 outside of the pipe 14.

The well is made of a high temperature material which does not react with the liquid flowing through the pipe 14. An example of such a material is stainless steel and particularly stainless steel 347. The well 16 is an elongated member having a front tapered portion 22, a central cylindrical portion 24 and a rear cylindrical portion 26 of smaller diameter than the central portion 24. The portion 26 is provided with a thread 28 and the part 30 to the rear or left of the thread 28 is of reduced cross section. Preferably the portions 24 and 26 are connected by means of a fillet 32. Tapered portion 22 which comprises the front end of the well 16 is also connected by means of a fillet 32. Tapered portion 22 which comprises the front end of the well 16 is also connected to the central portion 24 by a fillet 34. The fillet 34 permits the maximum cross section of the tapered portion 22 to be relatively small as well as to reduce stress concentrations at the juncture of portions 22 and 24. From this maximum cross section the tapered portion 22 linearly decreases in cross section and terminates in a hemispherical tip 36. The purpose of the hemispherical tip will become clear as this description proceeds. Central portion 24 of the wall 16 is provided near the forward end thereof with a flange 38. Flange 38 is substantially flush with the inner surface of the pipe 14 and is spaced from the portion of the pipe surrounding the aperture 12. Surrounding flange 38 is a ring 40 having an arcuate forward surface 42 and a rearwardly extending tip 44. The central portion 24 of well 16 is welded to the pipe 14 by material 46 and the ring 40 provides for a tight seal between the flange 38 and the pipe 14.

Extending substantially the full length of the well 16 and through the center thereof is a cavity 48 in which the insert 18 is disposed. Cavity 48 is not of uniform diameter, the diameter thereof being reduced in steps as the cavity extends from the rear end of the well to the forward end adjacent the tip 36. As shown herein, the cavity 48 has three portions of different diameter.

As was stated above, the head and terminal block assembly 20 is threadedly secured to well 16 by means of threads 28 on the well 16 and complementary threads 50 on the internal surface of the head 20. To fixedly secure the head relative to the well, a set screw 52 may be employed. Head and terminal block assembly 20 comprises a head 54 which is preferably cast of aluminum although other materials and methods of fabrication may be employed. Head 54 includes a cylindrical portion 56 which surrounds portions 28 and 30 of well 16. The head 54 also comprises a downwardly extending tubular portion 58 having a cavity 60 to permit electrical conductors to enter into the head from the outside. Overlying the rear surface of the head is a cover 62 which is secured to the head in any suitable manner such as by a screw 64. Fixedly mounted inside the head cavity 66 is a terminal block 68 on which are mounted at least two terminals 70, 71 as by suitable attaching means such as the screw 72. The terminal block 68 is of course made of an electrical insulating material such as, for instance, a plastic impregnated fibre glass. The terminals 70, 71 are provided with terminal posts 74, 75 to which the conductors extending from the temperature sensing device are connected as will be described hereinafter.

Referring now to FIG. 3, the insert 18 is therein shown in detail. Insert 18 includes a tube 76 which extends from the rear end of the insert. The tube may be made of any suitable high temperature material such as, for instance, stainless steel 304. The right end of the tube 76 is indicated as reference numeral 78. This tube portion 78 is of substantially the same internal diameter as the tube 76 but has a smaller external diameter. Disposed within tube 76, 78 is a cylindrical insulator 79 containing two parallel cylindrical passageways 80, 81 therein. This insulator 79 is preferably made of a ceramic material although other high temperature non-conducting materials may be employed. The left hand or rear end of tube 79 is spaced from the end of the tube 76 and the right hand or front end of tube 79 is spaced from the associated end of tube 78. Disposed within tube 78 adjacent its front or right end is a sleeve 82 which is in abutting relation with the right hand end of insulating cylinder 79. Integral with and forming a right end portion of sleeve 82 there is shown the sleeve 84 which is made of a suitable high temperature material such as, for instance, stainless steel 304. Disposed within sleeve portions 82, 84 is another insulating cylinder 85 of a refractory type such as a ceramic tube. Cylinder 85 extends to the right of the cylindrical insulating tube 79 at the left hand end of the former, and the right hand end of cylinder 85 is spaced from the right hand end of tube 84 so as to provide an internal shoulder. The insulating cylinder 85 is shown containing two cylindrical passageways 86, 87 therein which are in alignment with the passageways 80 and 81 in insulating tube 79. Disposed within tube 84 at its right hand or front end is a silver tip 88 having a tapered front portion 89 extending from the outer surface of tube 84 to a point and a cylindrical portion 90 which extends into the tube 84 and abuts against the insulating tube 85. Preferably, the joints between tip 88 and tube 84, and the joints between tube 84 and tube 78, are soldered as by silver solder.

Disposed at the front or right hand end of cylinder 85 is a temperature sensing device such as, for instance, a thermistor 92. As shown herein, thermistor 92 is fixedly held in its defined position by a suitable high temperature cement 94 such as, for instance, sauereisen cement. As is well known to those skilled in the art, a thermistor is a resistor having a negative temperature coefficient. By measuring the resistance of thermistor 92, the temperature surrounding the thermistor can be determined. The apparatus for measuring the resistance of the thermistor is well known to those skilled in the art and no description of this auxiliary apparatus is necessary. Suffice it to say that this apparatus may be an electrical bridge and conductors from the bridge extend through tubular portion 58 of head 54 and are connected to terminals 70, 71 to connect the thermistor 92 into the bridge circuit by way of the conductors 100, 102. The thermistor employed in the present invention is preferably of the bead type having two parallel conductors 100 and 102 extending out of the rear end thereof. Moreover, the thermistor is preferably of the type which is encapsulated in high temperature glass. In view of the fact that the thermistor is located extremely close to the silver tip 88 which is an excellent conductor, any changes in temperature will be rapidly reflected in a change in the resistance of the thermistor whereby to insure rapid response to changes in temperature of the liquid flowing through pipe 14.

Although FIG. 3 has been expanded in the transverse direction to more clearly illustrate the features of construction of the insert 18, it is to be understood that the tolerances of the passageways 80, 81 and 86, 87 are very close and that the space provided for the thermistor conductors 100 and 102 is just enough to permit the conductors to extend through these passageways. Furthermore, in a specific embodiment of this invention, the maximum diameter of the passageways is about .035 inch and the diameter of each of the wires 100, 102 is only about .010 inch.

At the rear or left hand end of the insert 18 is an insulating terminal cap 104 having a pair of terminals 106 and 108 mounted therein preferably with a hermetic seal. The cap 104 fits inside of tube 76 and abuts against the left hand end of tube 76. Between the cap 104 and the insulating cylindrical portion 79 and within the confines of the tube 76 there is shown magnesium oxide powder 109. Preferably, cap 104 is flanged to provide for abutment of the cap against the left hand or rear edge of tube 76. Disposed around tube 76 and fixed thereto as by silver solder 110 is a flange or washer 112. Slidably mounted on tube 76 is a collar 114. Furthermore, the left hand or rear end portion of tube 76 is surrounded by a sleeve 116 which is fixed thereto by silver solder. The right hand end of sleeve 116 provides an abutment to permit the movement of the collar 114 in a rearward direction. Surrounding tube 76 and disposed between collar 114 and washer 112 is a spring 118 which is held in compression. The reason for these elements will become clear hereinafter.

As was previously stated, the insert 18 is disposed within the cavity 48 in the well 16. The cavity 48 is proportioned so as to receive the insert 18 with very close tolerances particularly at the reduced section at end 120. The right hand end 120 of the cavity 48 is tapered with substantially the precise taper as that of the tapered portion 89 of tip 88 of insert 18. Accordingly, the silver tip 88 on the insert 18 fits very closely into the tapered cavity end 120 to bring the silver tip as close as possible to the front or right end of well 16. In accordance with one feature of the present invention, I have found that the hemispherical tip 36 of the well 16 provides maximum strength at the tip of the well and thereby permits the thickness of the well casing at the tip 36 to be extremely small. With this thickness reduced to an absolute minimum due to the configuration of the cavity and the surface of the well casing, the conduction of heat through the well casing will be delayed a minimum amount of time to thereby insure rapid response by the thermistor to changes in temperature of the liquid. To insure that the silver tip 88 is kept in abutting relation with the tapered end 120 of cavity 48, the terminal block 68 abuts against collar 114 to prevent the collar from moving rearwardly of the insert 18. With the collar position fixed, spring 118 exerts a force in the forward direction against washer 112 and, accordingly, against the entire insert 18, thereby forcing the insert in a rightward or forward direction to resiliently hold it so that the tip 88 will abut against the tapered portion 120 of the cavity 48. A temperature sensing device embodying the above described characteristics has been made wherein the radius of the hemispherical tip 36 of well 16 is equal to about .133 inch and the minimum thickness of the well wall from the apex of the tapered end of cavity 48 is only .081 inch.

The tapered forward end 22 of the well 16 is so shaped not only to produce the rapid temperature responses discussed above but also to provide the forward end with a very high resonant frequency, so high in fact that it will not resonate in response to the flow of liquid through pipe 14 at rates up to forty feet per second. In the specific embodiment mentioned in the preceding paragraph, the central portion 24 of the well has a diameter of 1¼ inches and a length of about 2²¹⁄₃₂ inches. The length of end portion 22 of well 16 is about 4⅓ inches and the fillet extending between the tapered part thereof and the right hand end of the central portion has a ¾ inch radius. The overall length of well 16 is about 10.7 inches. With such a well structure, there was no tendency to resonate when mounted in a fourteen inch diameter pipe as described and subjected to water flowing at rates up to forty feet per second and under pressures of two thousand p.s.i.

With a temperature sensing device of the type disclosed herein, it has been found that extremely high rates of response to temperature changes can be achieved even when the device is subjected to pressures of the order of two thousand p.s.i., which pressures would naturally demand high mechanical strength. Moreover, and as stated hereinbefore, even with high rates of flow of the order of forty feet per second through a pipe fourteen inches in diameter, there is no tendency of this device to resonate, which resonance would lead ultimately to mechanical failure. By utilizing a thermistor as the temperature sensing device, high temperatures can be encountered. For instance, temperatures in excess of six hundred and fifty degrees have been accurately detected with a device of the design described herein. Moreover, with a thermistor as the temperature sensing element, the speed of response of this device to temperature changes has been of the order of 1½ seconds with liquids flowing through pipe 14 at 10 feet per second. An example of a thermistor which has been successfully used is Thermistor Corporation of America's Model No. 51CA1 which has a nominal resistance at twenty-five degrees centigrade of one hundred thousand ohms, a temperature coefficient of −4.6 percent at twenty-five degrees centigrade and a diameter of .04 inch.

The present invention thus provides a high speed temperature sensing device that will accurately measure the temperature of fluids flowing at rapid rates and under high pressures.

What is claimed is:

1. A high strength temperature sensing element useful for measuring the temperature of fluids flowing through a conduit at rates tending to induce resonance in the temperature sensing element, comprising an elongated unitary well of a solid-one-piece construction having a natural mechanical frequency of vibration sufficiently high to prevent said element from resonating as a result of the flow of fluid, said well having a longitudinal cavity therein formed by the inner wall thereof and having a substantially cylindrical outer-wall central portion adapted to be inserted in pressure tight relation through a wall portion of said conduit, said well having a tapered wall of a diminishing thickness along an axis that extends into the conduit, the outer-wall portion of the portion being of diameter substantially smaller than said central portion, comprising the temperature sensing end of said element, the junction of said tapered and central outer-wall portions comprising a fillet thereby effecting a reduction in the stress concentrations at said junction, the other end of said tapered portion terminating in a temperature sensing tip of hemispherical-shape configuration and having high thermal conductivity, the inner wall portion of the other end of the tapered portion being of a cone-shaped configuration, the cone-shaped inner wall being positioned to extend axially to an apex immediately adjacent the extreme outer end of the hemispherical tip to thereby form an end portion of the inner wall cavity, a member having high thermal conductivity positioned within the apex formed in the hemispherical tip, said member having a conical end in mating engagement with the said inner conical wall portion, and a temperature sensitive element in heat transmitting engagement with said member.

2. A high strength temperature sensing element useful for measuring the temperature of fluids flowing through a conduit at rates tending to induce resonance in the temperature sensing element, comprising an elongated unitary well of a solid one-piece construction having a natural mechanical frequency of vibration sufficiently high to prevent said element from resonating as a result of the flow of fluid, said well having a longitudinal cavity therein formed by the inner wall thereof and having a substantially cylindrical outer-wall central portion adapted to be inserted in pressure tight relation through a wall portion of said conduit, said well having a tapered wall of a diminishing thickness along an axis that extends into the conduit, the outer-wall portion of the portion being of diameter substantially smaller than said central portion, comprising the temperature sensing end of said element, the junction of said tapered and central outer-wall portions comprising a fillet thereby effecting a reduction in the stress concentrations at said junction, the other end of said tapered portion terminating in a temperature sensing tip of hemispherical-shape configuration and having high thermal conductivity, the inner wall portion of the other end of the tapered portion being of a cone-shaped configuration, the cone-shaped inner wall being positioned to extend axially to an apex immediately adjacent the extreme outer end of the hemispherical tip to thereby form an end portion of the inner wall cavity, a member having high thermal conductivity positioned within the apex formed in the hemispherical tip, said member having a conical end in mating engagement with the said inner conical wall portion, a temperature sensitive element in heat transmitting engagement with said member producing a measurable signal in accordance with the temperature thereof, terminal means, and means extending longitudinally from said temperature sensitive element through said cavity in said well to said terminal means.

3. A high strength temperature sensing element useful for measuring the temperature of fluids, flowing through a conduit at rates tending to induce resonance in the temperature sensing element, comprising an elongated unitary well of a solid one-piece construction having a natural mechanical frequency of vibration sufficiently high to prevent said element from resonating as a result of the flow of fluid, said well having a longitudinal cavity therein formed by the inner wall thereof and having a substantially cylindrical outer-wall central portion adapted to be inserted in pressure tight relation through a wall portion of said conduit, said well having a tapered wall of a diminishing thickness along an axis that extends into the conduit, the outer-wall portion of the portion being of diameter substantially smaller than said central portion, comprising the temperature sensing end of said element, the junction of said tapered and central outer-wall portions comprising a fillet thereby effecting a reduction in the stress concentrations at said junction, the other end of said tapered portion terminating in a temperature sensing tip of hemispherical-shape configuration and having high thermal conductivity, the inner wall portion of the other end of the tapered portion being of a cone-shaped configuration, the cone-shaped inner wall being positioned to extend axially to an apex immediately adjacent the extreme outer end of the hemispherical tip to thereby form and end portion of the inner wall cavity, a member having high thermal conductivity positioned within the apex formed in the hemispherical tip, said member having a conical end in mating engagement with the said inner conical wall portion, an electrical temperature sensitive element in heat transmitting engagement with said member producing a measurable signal accordance with the temperature thereof, terminal means, and electrical conductors extending longitudinally from said electrical temperature sensitive element through said cavity in said well to said terminal means.

4. A high strength temperature sensing element useful for measuring the temperature of fluids flowing through a conduit at rates tending to induce resonance in the temperature sensing element, comprising an elongated unitary well of a solid one-piece construction having a natural mechanical frequency of vibration sufficiently high to prevent said element from resonating as a result of the flow of fluid, said well having a longitudinal cavity therein formed by the inner wall thereof and having a substantially cylindrical outer-wall central portion adapted to be inserted in pressure tight relation through a wall portion of said conduit, said well having a tapered wall of diminishing thickness along an axis that extends into the conduit, the outer-wall portion of the portion being of diameter substantially smaller than said central portion, comprising the temperature sensing end of said element, the junction of said tapered and central outer-wall portions comprising a fillet thereby effecting a reduction in the stress concentrations at said junction, the other end of said tapered portion terminating in a temperature sensing tip of hemispherical-shape configuration and having high thermal conductivity, the inner wall portion of the other end of the tapered portion being of a cone-shaped configuration, the cone-shaped inner wall being positioned to extend axially to an apex immediately adjacent the extreme outer end of the hemispherical tip to thereby form an end portion of the inner wall cavity, a member having high thermal conductivity positioned within the apex formed in the hemispherical tip, said member having a conical end in mating engagement with the said inner conical wall portion, a thermistor bead in heat transmitting engagement with said member producing a measurable signal in accordance with the temperature thereof, terminal means, and electrical conductors extending longitudinally from said thermistor bead through said cavity in said well to said terminal means.

5. A high strength temperature sensing element useful for measuring the temperature of fluids flowing through a conduit at rates tending to induce resonance in the temperature sensing element, comprising an elongated unitary well of a solid one-piece construction having a natural mechanical frequency of vibration sufficiently high to prevent said element from resonating as a result of the flow of fluid, said well having a longitudinal cavity therein formed by the inner wall thereof, said well having a substantially cylindrical central wall portion of uniform thickness adapted to have a central outer peripheral wall surface thereof inserted in pressure tight relation with an apertured wall portion of a conduit through which the flow of fluid is passing, the central wall portion having ends that extend in opposite directions respectively away from the outer and inner wall surface of the conduit, said well having a tapered wall of a diminishing thickness along an axis that extends into the conduit, the outer wall portion of the portion being of a diameter substantially smaller than said central portion integral with and extending from one of the ends into the conduit comprising the temperature sensing end of said element, the junction of said tapered and central wall portions comprising a fillet extending between their outer wall surfaces thereby effecting a reduction in the stress concentrations at said junction, the other end of said tapered portion terminating in a temperature sensing tip of hemispherical-shape configuration and having high thermal conductivity, the inner wall portion of the other end of the tapered portion being of a cone-shaped configuration, the cone-shaped inner wall being positioned to extend axially to an apex immediately adjacent the extreme outer end of the hemispherical tip to thereby form an end portion of the inner wall cavity, a member having high thermal conductivity positioned within the apex formed in the hemispherical tip, said member having a conical end in mating engagement with the said inner conical wall portion, and a temperature sensitive element in heat transmitting engagement with said member.

6. A high strength temperature sensing element useful for measuring the temperature of fluids flowing through a conduit at rates tending to induce resonance in the temperature sensing element, comprising an elongated unitary well of a solid one-piece construction having a natural mechanical frequency of vibration sufficiently high to prevent said element from resonating as a result of the flow of fluid, said well having a longitudinal cavity therein formed by the inner wall thereof, said well having a substantially cylindrical central wall portion of uniform thickness adapted to have a central outer peripheral wall surface thereof inserted in pressure tight relation with an apertured wall portion of a conduit through which the flow of fluid is passing, the central wall portion having ends that extend in opposite directions respectively away from the outer and inner wall surface of the conduit, said well having a tapered wall of a diminishing thickness along an axis that extends into the conduit, the outer wall portion of the portion being of a diameter substantially smaller than said central portion integral with and extending from one of the ends into the conduit comprising the temperature sensing end of said element, the junction of said tapered and central wall portions comprising a fillet extending between their outer wall surfaces thereby effecting a reduction in the stress concentrations at said junction, the other end of said tapered portion terminating in a temperature sensing tip of hemispherical-shape configuration and having high thermal conductivity, the inner wall portion of the other end of the tapered portion being of a cone-shaped configuration, the cone-shaped inner wall being positioned to extend axially to an apex immediately adjacent the extreme outer end of the hemispherical tip to thereby form an end portion of the inner wall cavity, a member having high thermal conductivity positioned within the apex formed in the hemispherical tip, said member having a conical end in mating engagement with the said inner conical wall portion, a temperature sensitive element in heat transmitting engagement with said member producing a measurable signal in accordance with the temperature thereof, terminal means, and means extending longitudinally from said temperature sensitive element through said cavity in said well to said terminal means.

7. A high strength temperature sensing element useful for measuring the temperature of fluids flowing through a conduit at rates tending to induce resonance in the temperature sensing element, comprising an elongated unitary well of a solid one-piece construction having a natural mechanical frequency of vibration sufficiently high to prevent said element from resonating as a result of the flow of fluid, said well having a longitudinal cavity therein formed by the inner wall thereof, said well having a substantially cylindrical central wall portion of uniform thickness adapted to have a central outer peripheral wall surface thereof inserted in pressure tight relation with an apertured wall portion of a conduit through which the flow of fluid is passing, the central wall portion having ends that extend in opposite directions respectively away from the outer and inner wall surface of the conduit, said well having a tapered wall of a diminishing thickness along an axis that extends into the conduit, the outer wall portion of the portion being of a diameter substantially smaller than said central portion integral with and extending from one of the ends into the conduit comprising the temperature sensing end of said element, the junction of said tapered and central wall portions comprising a fillet extending between their outer wall surfaces thereby effecting a reduction in the stress concentrations at said junction, the other end of said tapered portion terminating in a temperature sensing tip of hemispherical-shape configuration and having high thermal conductivity, the inner wall portion of the other end of the tapered portion being of a cone-shaped configuration, the cone-shaped inner wall being positioned to extend axially to an apex immediately adjacent the extreme outer end of the hemispherical tip to thereby form an end portion of the inner wall cavity, a member having high thermal conductivity positioned within the apex formed in the hemispherical tip, said member having a conical end in mating engagement with the said inner conical wall portion, an electrical temperature sensitive element in heat transmitting engagement with said member producing a measurable signal in accordance with the temperature thereon, terminal means, and electrical conductors extending longitudinally from said electrical temperature sensitive element through said cavity in said well to said terminal means.

8. A high strength temperature sensing element useful for measuring the temperature of fluids flowing through a conduit at rates tending to induce resonance in the temperature sensing element, comprising an elongated unitary well of a solid one-piece construction having a natural mechanical frequency of vibration sufficiently high to prevent said element from resonating as a result of the flow of fluid, said well having a longitudinal cavity therein formed by the inner wall thereof, said well having a substantially cylindrical central wall portion of uniform thickness adapted to have a central outer peripheral wall surface thereof inserted in pressure tight relation with an apertured wall portion of a conduit through which the flow of fluid is passing, the central wall portion having ends that extend in opposite directions respectively away from the outer and inner wall surface of the conduit, said well having a tapered wall of a diminishing thickness along an axis that extends into the conduit, the outer wall portion of the portion being of a diameter substantially smaller than said central portion integral with and extending from one of the ends into the conduit comprising the temperature sensing end of said element, the junction of said tapered and central wall portions comprising a fillet extending between their outer wall surfaces thereby effecting a reduction in the stress concentrations at said junction, the other end of said tapered portion terminating in a temperature sensing tip of hemispherical-shape configuration and having high thermal conductivity, the inner wall portion of the other end of the tapered portion being of a cone-shaped configuration, the cone-shaped inner wall being positioned to extend axially to an apex immediately adjacent the extreme outer end of the hemispherical tip to thereby form an end portion of the inner wall cavity, a member having high thermal conductivity positioned within the apex formed in the hemispherical tip, said member having a conical end in mating engagement with the said inner conical wall portion, a thermistor bead in heat transmitting engagement with said member producing a measurable signal in accordance with the temperature thereof, terminal means, and electrical conductors extending longitudinally from said thermistor bead through said cavity in said well to said terminal means.

References Cited by the Examiner
UNITED STATES PATENTS

| | | | |
|---|---|---|---|
| 2,161,432 | 6/39 | Rees | 73—374 |
| 2,465,981 | 3/49 | Robertson | 136—4.7 |
| 2,484,585 | 10/49 | Quinn | 73—362 |
| 2,546,415 | 3/51 | Alcock | 73—362 |
| 2,560,455 | 7/51 | Knight | 73—343 |
| 2,590,041 | 3/52 | Roost | 338—28 |
| 2,938,385 | 5/60 | Mack et al. | 73—362 |
| 2,973,495 | 2/61 | Greenberg | 338—28 |

ISAAC LISANN, *Primary Examiner.*